United States Patent [19]

Pakowsky

[11] Patent Number: 5,163,695
[45] Date of Patent: Nov. 17, 1992

[54] DOLLY ATTACHMENT FOR CARRYING FLAT FURNITURE COMPONENTS

[76] Inventor: Lee A. Pakowsky, 317 NE. 21st St., Wilton Manors, Fla. 33305

[21] Appl. No.: 763,893

[22] Filed: Sep. 23, 1991

[51] Int. Cl.$^5$ .............................. B62B 3/02
[52] U.S. Cl. ........................ 280/79.7; 248/434
[58] Field of Search ............ 280/79.11, 79.7, 79.3, 280/638, 35, 639, 641, 651, 47.34, 47.35, 47.41; 108/55.1, 54.1; 248/166, 434

[56] References Cited

U.S. PATENT DOCUMENTS

| | | | |
|---|---|---|---|
| 1,286,801 | 12/1918 | Schumacher | 108/55.1 |
| 1,836,362 | 12/1931 | Crowley | 108/55.1 |
| 4,353,520 | 10/1982 | Jansson | 248/346 |
| 4,488,733 | 12/1984 | Hellsten | 280/47.16 |
| 4,793,624 | 12/1988 | Mace | 280/47.16 |
| 4,867,465 | 9/1989 | Dunchock | 280/79.3 |
| 5,037,117 | 8/1991 | Hershberger | 280/79.7 |

Primary Examiner—Andres Kashnikow
Assistant Examiner—Richard Comby
Attorney, Agent, or Firm—Oltman and Flynn

[57] ABSTRACT

An attachment for carrying flat furniture components on a dolly, which includes a main frame for supporting the furniture components on the dolly, a main frame attachment arrangement for detachably attaching the main frame to the dolly in raised position, a pivot frame attached to the main frame for supporting the main frame, a pivot frame attachment arrangement for detachably attaching the pivot frame to the dolly, and a strapping arrangement for strapping the furniture component to the main frame.

9 Claims, 4 Drawing Sheets

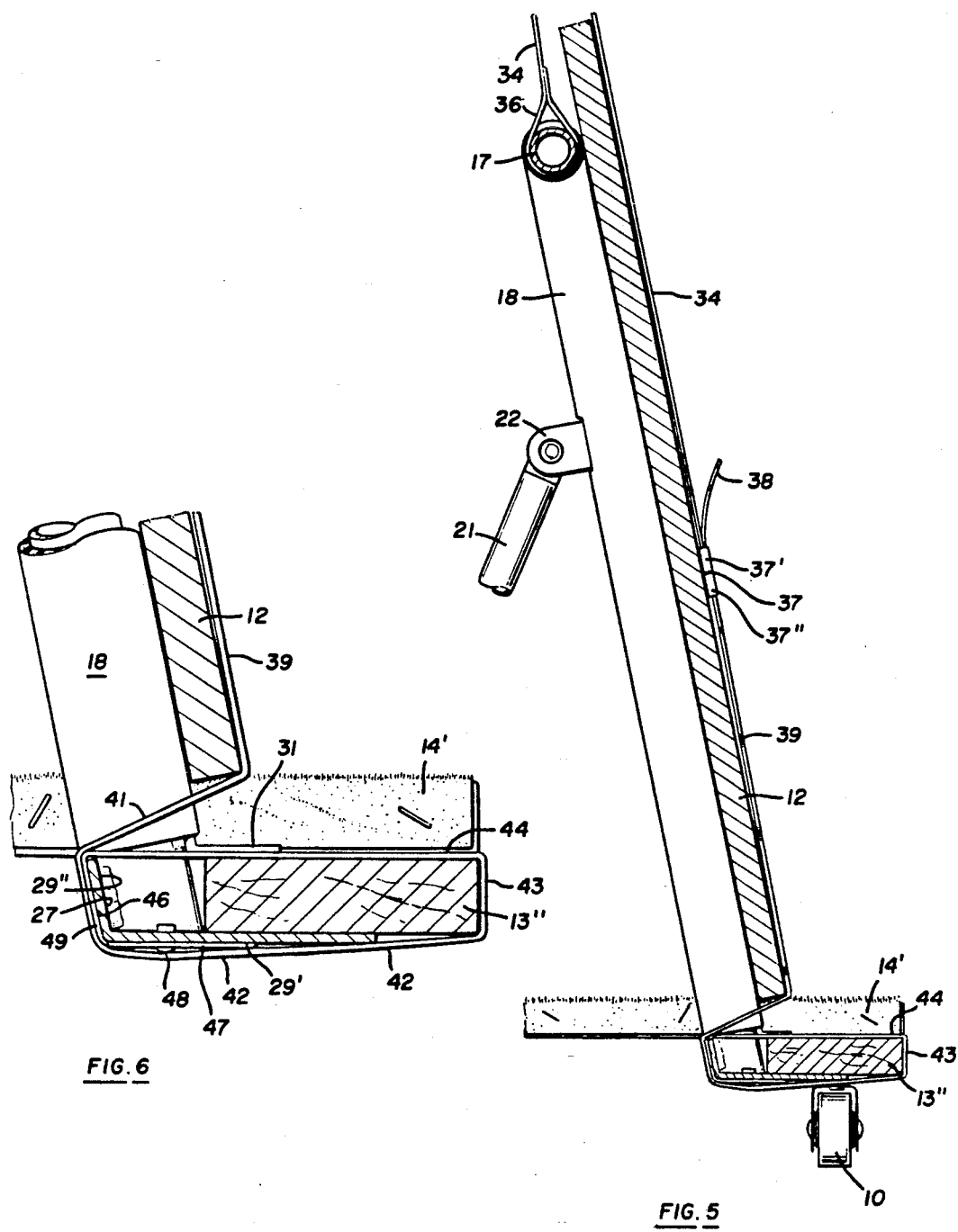

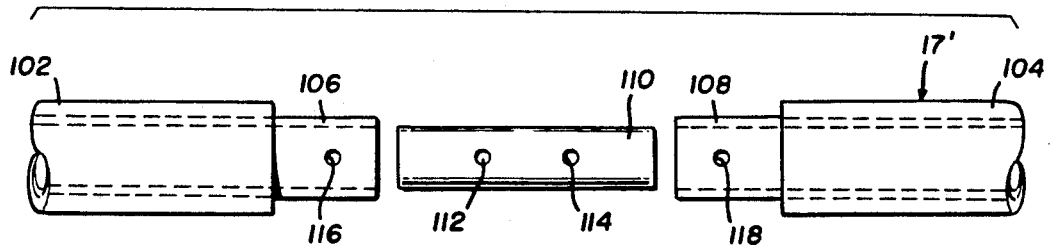
FIG. 8
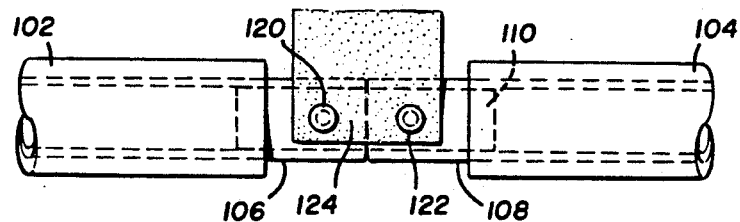
FIG. 9
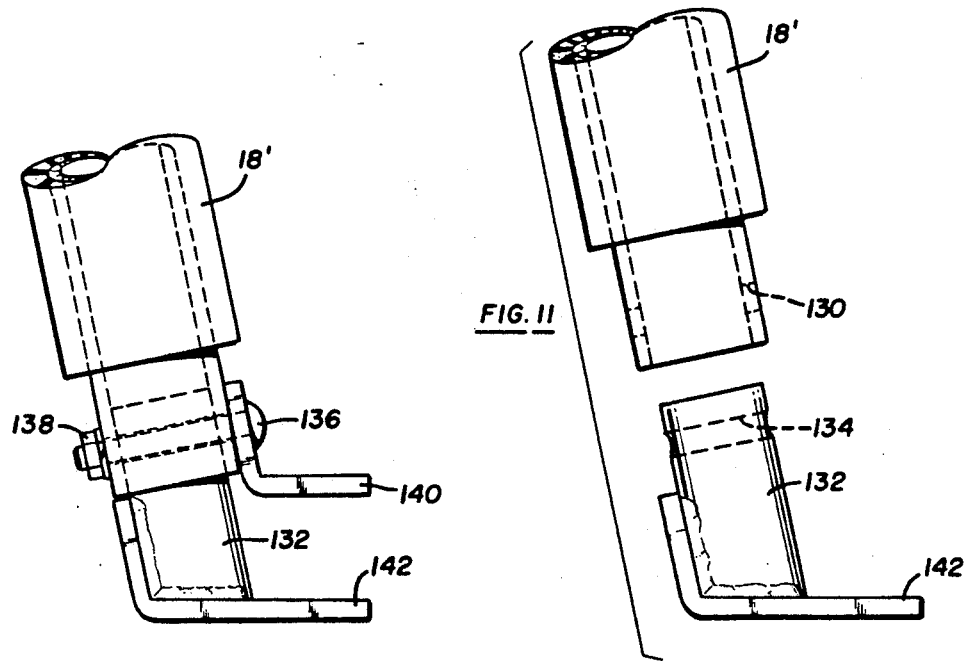
FIG. 10
FIG. 11

DOLLY ATTACHMENT FOR CARRYING FLAT FURNITURE COMPONENTS

The invention relates to a frame arrangement for carrying flat furniture components on a wheeled dolly, and more particularly to a dolly attachment that is readily attachable to the dolly when needed and again detached and folded for storage when no longer needed.

BACKGROUND AND PRIOR ART

In the furniture moving business large furniture components have to be moved through narrow doorways, hallways and narrow walkways. It is often necessary to use dollies or hand trucks to move the larger items. Large flat furniture components such as glass, stone, wood or composite table tops and other tables, pictures, mirrors, bedding, headboards, windows, doors, panels, etc. must be balanced on edge on a standard four wheel dolly or carried by two (2) or more people with one person walking backward. This can be very awkward and dangerous.

With the dolly attachment the above items can be moved safely and more efficiently by a single person or with little help from another.

When the dolly attachment is not needed it can be folded up for easy storage and is not a permanent part of the standard dolly, which can then be used to move other large pieces of furniture.

Wheeled dollies having up-standing railings or the like that are attached to a dolly are well-known for transport of flat structures. For example, U.S. Pat. No. 4,793,624 shows a dolly with a railing at one side for transport of planar material such as plywood, sheets of drywall and the like. This dolly, however, is large and bulky, and not well suited for furniture transport in a residential or an office environment. U.S. Pat. No. 4,488,733 shows a wheeled plate carrier for transporting large size plates such as building boards and the like, which is also bulky and unsuitable for use in a residential or office environment.

It is accordingly an object of the invention to provide an attachment for a conventional compact furniture dolly, which is small, light weight and readily attachable to the dolly whenever needed, and again readily detached when no longer needed.

SUMMARY OF THE INVENTION

In accordance with the invention there is provided an attachment for carrying flat furniture components on a dolly, which includes a main frame for supporting the furniture components on the dolly, a main frame attachment for detachably attaching the main frame to the dolly in raised position, a pivot frame attached to the main frame for supporting the main frame, a pivot frame attachment arrangement for detachably attaching the pivot frame to the dolly, and a strapping arrangement for strapping the furniture component to the main frame.

According to a further feature, the main frame is shaped like an inverted letter U having downward pointing legs with leg ends, wherein the main frame attachment arrangement includes an angle bar extending between and connecting the leg ends, a bottom flange on the angle bar, and a tab on each leg end spaced apart from the bottom flange for receiving one side piece of the dolly in the space between the flange and the tabs.

The attachment according to the invention may further include pivot points on the main frame legs for pivotally attaching the pivot frame to the main frame, wherein the pivot frame attachment arrangement includes a tab and a short pivot frame strap for strapping the pivot frame to another side piece of the dolly.

According to still another feature, the strapping arrangement includes an upper strap attached at one end to the main frame, a lower strap attached at one end to the angle bar, and an adjustable belt buckle for adjustably joining the ends of the upper and lower straps, and wherein the belt buckle includes two parts, each part attached to a respective upper and lower strap, and a snap joint for joining the two belt buckle parts.

According to still another feature, the main frame has a layer of padding for protecting the furniture components against being scratched, and wherein the lower strap is wrapped around the side piece of the dolly at least one turn, and a hook-and-loop fastener for holding facing overlapping sides of the turn together.

There may further be provided a hook-and-loop fastener for securing the pivot frame strap to the other side piece of the dolly.

Another feature is that the tabs on the main frame are adjustable to accommodate different sized dollies.

Further objects and advantages of this invention will be apparent from the following detailed description of a presently preferred embodiment which is illustrated schematically in the accompanying drawings.

BRIEF DESCRIPTION OF THE FIGURES

FIG. 5 is a fragmentary detail view of the invention showing the strapping arrangement for strapping the furniture component to the main frame;

FIG. 6 is an elevational fragmentary detail view of the invention showing details of the method of strapping the lower part of the main frame to the side piece of the dolly;

FIG. 8 is an exploded fragmentary view of the top of the main frame showing a modification of the invention;

FIG. 9 shows the elements of FIG. 8 assembled together;

FIG. 10 is a fragmentary view of the bottom of the main frame showing a modification of the invention; and FIG. 11 is a fragmentary view like FIG. 10 showing the elements exploded.

Before explaining the disclosed embodiments of the present invention in detail it is to be understood that the invention is not limited in its application to the details of the particular arrangements shown since the invention is capable of other embodiments. Also the terminology used herein is for the purpose os description and not of limitation.

DESCRIPTION OF THE PREFERRED EMBODIMENTS

Figure 1:
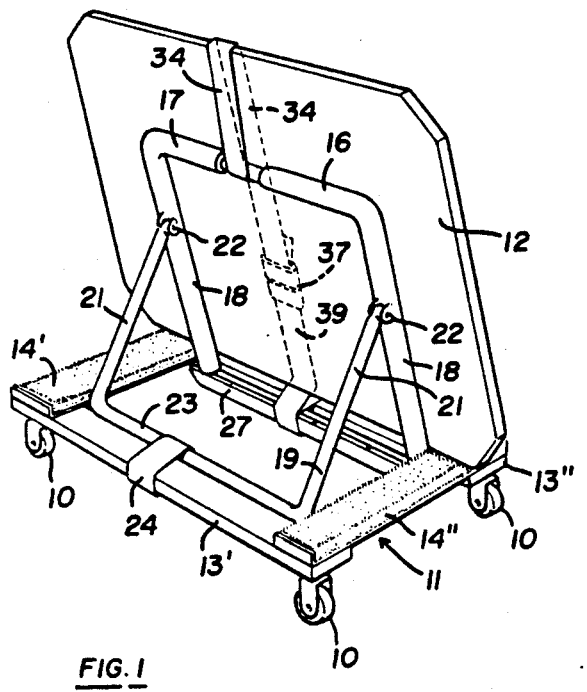
FIG. 1 is a perspective view of the invention showing a flat furniture component strapped to the dolly attachment.
Figure 2:
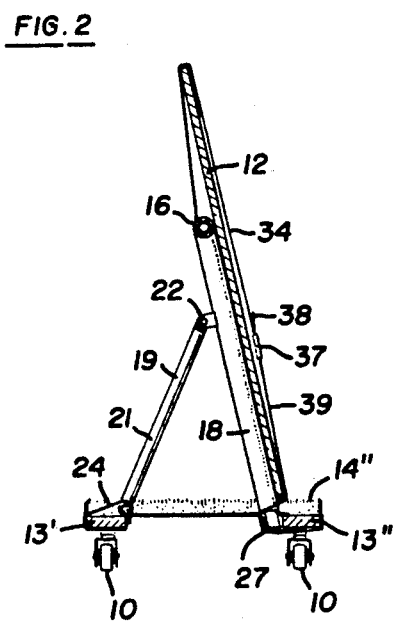
FIG. 2 is an elevational view of the invention seen along the line 2—2 of FIG. 3.
Figure 3:
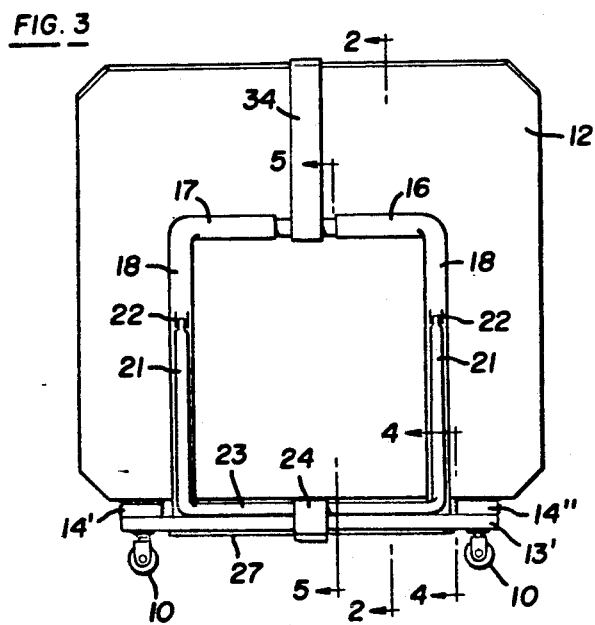
FIG. 3 is an elevational view of the invention according to FIG. 1 seen from one side.

In FIGS. 1, 2 and 3, a small compact furniture dolly 11 of conventional construction is shown, with a flat, large furniture component 12, such as a table top, mirror, a large picture or the like strapped to the dolly by means of the attachment according to the invention.

The dolly is composed of two side pieces 13' and 13"; and two cross pieces 14' and 14", which are normally padded with suitable padding material to avoid scratching or marring the furniture. The dolly has small wheels 10 on its underside.

The attachment according to the invention is composed of a padded main frame 16, advantageously shaped like an inverted letter "U" with the top part 17 of the "U" facing upward and the legs 18 facing downward and gripping the side piece 13" as described below.

A pivot frame 19 also shaped like a letter "U" has two legs 21, each having an upper end pivotally attached to the main frame at pivot points 22 so that the pivot frame 19 can be pivoted away from the main frame 16, and the bottom part 23 of the pivot frame 19 can be attached to the other side piece 13' of the dolly by a tab 50 secured to frame 19 and by means such as a strap 24 wrapped around the other side piece 13' and the bottom part 23 of the pivot frame 19.

The main frame 16 has its legs 18 and the top part 17 enclosed in padding material 30 (FIG. 4), such as foam rubber or the like to prevent scratching or marring the furniture component 12 strapped to the main frame 16.

Figure 4:
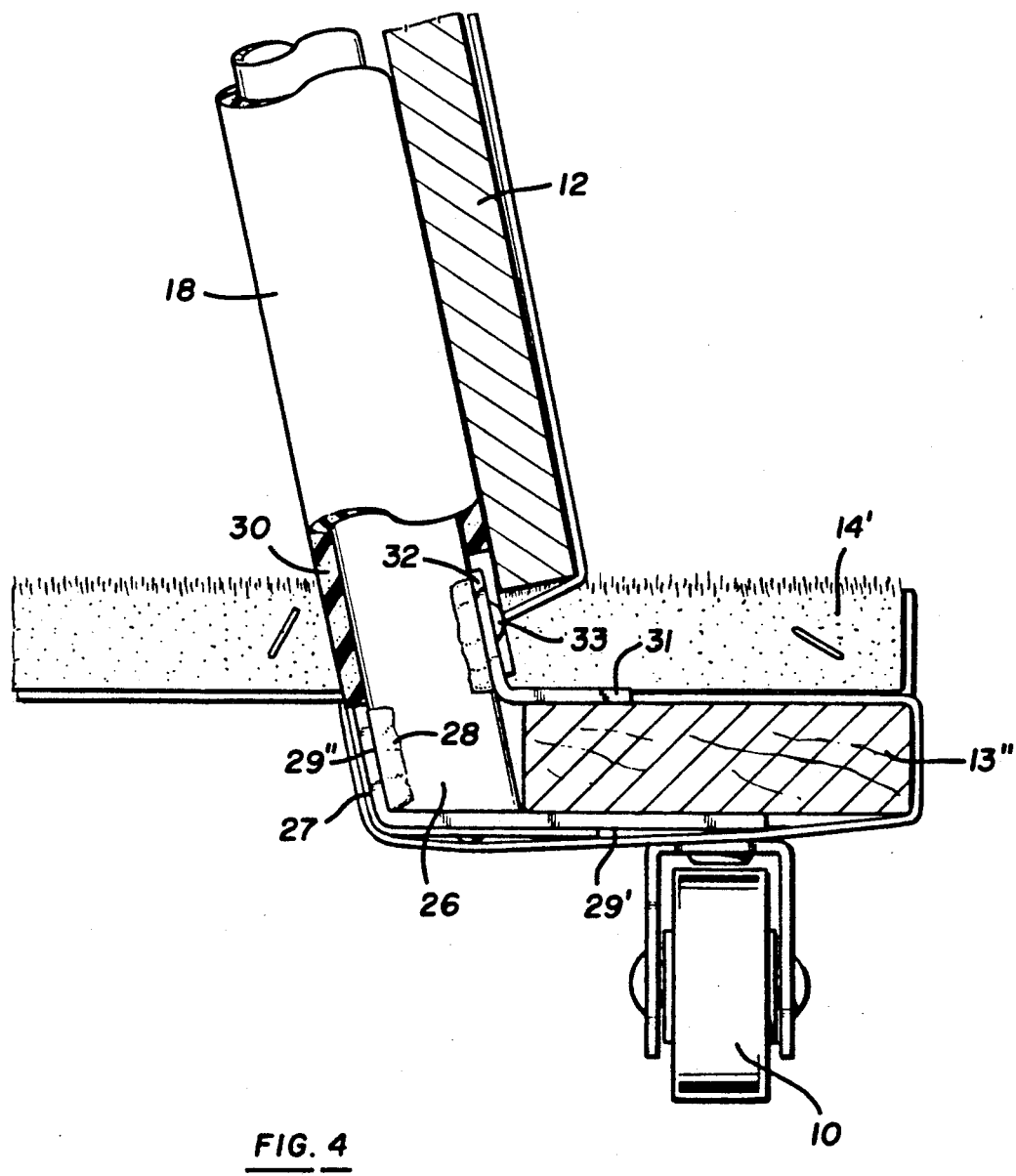
FIG. 4 is an elevational fragmentary enlarged detail view seen along the line 4—4 of FIG. 3 showing a part of the dolly with the main frame of the invention attached to a side piece of the dolly.

FIG. 4 shows the bottom end 26 of one of the legs 18 of the main frame 16 with part of the padding 30 cut away to show the structure of the leg 18. The bottom ends 26 of the two legs 18 are joined by an angle bar 27 of suitable metal, such as steel, aluminum, or the like, partially seen in FIGS. 1, 2 and 4, welded by weld seams 28, rivets, screws or the like, to the ends 26 of the legs. The angle bar 27 has a bottom flange 29' and a top flange 29" at an angle of 8°–12° and each leg end 26 has a tab 31 parallel with the bottom flange 29' but spaced therefrom by a distance corresponding to the thickness of the dolly side piece 13", so that the inner edge of the side piece 13" can be received in the space between the bottom flange 29' and the tab 31. The tab 31 has a bent part 32 adjustably attached to the leg end 26 by bolts, screws 33 or the like. A hole (not shown) receiving bolt or rivet 33 is elongated to allow adjustment of the tab.

FIG. 4 also shows a part of the padded cross piece 14', one of the dolly wheels 10, and the flat furniture component 12.

FIG. 5 shows the main frame 16 seen from the side and details of the strapping arragement provided for strapping the flat furniture component 12 to the main frame 16. The strapping arrangement includes an upper strap 34, also seen in FIG. 1, which is attached at one end 36 to the upper part 17 of the main frame 16, which has its padding removed at the middle to give access to the upper strap part end 36, and from there goes upward over the upper edge of the furniture component 12 and back down along the outside of the furniture component 12 and is threaded through a two-part belt buckle 37 wherein the two buckle parts are joined by a snap connection for connecting the two buckle parts. The buckle and strapping is of similar construction to the conventional safety belt buckle used in cars and airplanes. The upper strap is threaded through the top part 37' of the buckle, so that the strap can be tightened by pulling taut the loose end 38 of the strap 34. A lower strap 39 is terminated at one end in the bottom part 37" of the buckle and goes from there downward along the outside of the furniture component 12 to the bottom end of the component; from there inward, as seen in more detail in FIG. 6, along belt section 41 to the upper edge of the top flange 29" of the angle bar 27, down at 49 and forward along section 42, again up along section 43 and inward along section 44, again downward along section 46 and forward along section 47 to be fastened by bolts, rivets or the like 48 into the bottom flange 29'. In this way the lower strap is wrapped around the side piece 13" and the angle bar 27 at least once which provides a strong hold on the bottom end of the lower strap 39. To further strengthen the hold, patches of hook-and-loop fastener material may be placed on facing sides of the overlapping part of the belt.

Figure 7:
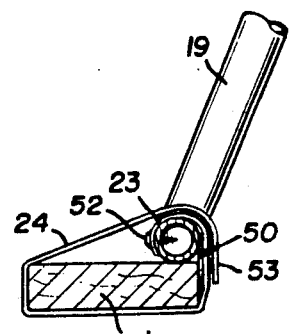
FIG. 7 is an elevational fragmentary detail of the invention showing the method of strapping the pivot frame to the other side piece of the dolly.

FIG. 7 shows the arrangement for attaching the pivot frame 19 to the other side piece 13' of the dolly 11. The arrangement includes a pivot frame strap 24, seen in more detail in FIG. 7, wich shows the pivot frame strap 24 terminated at its inner end to the bottom part 23 of the pivot frame by means of a screw 52, rivet or the like, from where it is wrapped around the other side piece 13' and the bottom part 23 of the pivot frame to be terminated in a hook-and-loop fastener 53 on the overlapping sides of the pivot frame strap 24. The tab 50 is secured to bottom part 23 of the pivot frame and buts against dolly member 13'.

The term "hook-and-loop" refers to a fastener material which is composed of two patches of fabric, one of which is a weave having upstanding hooks that engage a tight loop weave forming the other patch, when the two patches are joined.

FIGS. 8 and 9 show a modification of the top 17' of the main frame 16. Padding portions 102 and 104 of the top 17' are hollow and receive frame members 106 and 108 which are also hollow. A bar 110 has openings 112 and 114, and portions 106 and 108 have openings 116 and 118. When these elements are assembled together as in FIG. 9, the bar 110 is received in frame portions 106 and 108. A screw 120 enters openings 112 and 116 and holds a strap 124, and another screw 122 enters openings 114 and 118 and also holds strap 124.

FIGS. 10 and 11 show a modification of the bottom of the main frame. The leg 18' of the main frame has a through hole 130, and a foot member 132 has a hole 134. An angle bar 142 is welded onto the bottom of foot member 132. When assembled, a bolt 136 passes through holes 134 and 130 and is fastened by a nut 138. A tab 140 is held onto the leg 18' by the bolt 136.

In operation, when a large flat furniture component is to be moved, the main frame is positioned on the dolly with the bottom flange 29 and the tab 31 gripping the inner edge of the side piece 13" of the dolly with lower strap 39 wrapped around side piece 13". The pivot frame is pivoted out as shown in FIG. 1 and attached with the short strap 24 to the inner edge of other side piece 13' of the dolly. The furniture component is placed with an edge on the two padded cross pieces 14' and 14" and leaned against the padded main frame 16. The top part 34 of the other strap is placed over the top edge of the furniture component 12 and buckled with the snap joint buckle 37 to the bottom strap 39. The loose end 38 is pulled taut, holding the furniture component against the padded main frame 16, which can now be moved securely through doorways, hallways, etc. even by a single person with no risk of the furniture component falling off the dolly. These same components can be readily detached to remove the furniture component and also to remove the frame from the dolly.

I claim:

1. An attachment for carrying a flat furniture component on a dolly, comprising a main frame for supporting the furniture component on the dolly, detachable main frame attachment means for detachably attaching the main frame to the dolly, a pivot frame pivotally attached to the main frame for supporting the main frame, detachable pivot frame attachment means for detachably attaching the pivot frame to the dolly, strapping means for strapping the furniture component to the main frame wherein said main frame is shaped like a inverted U having downward pointing legs with leg ends, wherein said detachable main frame attachment means include an angle bar connecting said leg ends, a flange on the angle bar, and a tab on each leg end spaced apart from said flange for receiving a side piece of said dolly between the flange and the tabs, wherein said strapping means include an upper strap attached at one end to said main frame, a lower strap attached at one end to said angle bar, and an adjustable belt buckle for adjustably joining the other ends of said upper and lower straps.

2. An attachment according to claim 1 including pivot points on said legs for pivotally attaching said pivot frame to said main frame.

3. An attachment according to claim 1, wherein said belt buckle includes two parts, each part attached to a respective upper and lower strap, and a snap joint for joining the two parts.

4. An attachment according to claim 1, wherein said main frame has a layer of padding for protecting the furniture component against being scratched.

5. An attachment according to claim 1, wherein said lower strap is wrapped around said side piece at least one turn, and a hook-and-loop fastener on facing, overlapping sides of said turn for securing the frame to said side piece.

6. An attachment according to claim 1, wherein said detachable pivot frame attachment means include a pivot frame strap for strapping said pivot frame to another side piece of said dolly, and a tab for abutting the dolly, and including a hook-and-loop fastener patch for securing said pivot frame strap to said other side piece of said dolly.

7. An attachment according to claim 1 wherein said tab is adjustable.

8. An attachment according to claim 1 wherein said leg ends receive a foot.

9. An attachment according to claim 1 wherein said main frame has a top which is hollow and receives a bar to which a strap is fastened.

* * * * *